United States Patent
Howell

(10) Patent No.: US 10,706,815 B1
(45) Date of Patent: *Jul. 7, 2020

(54) ACCELERATED SECONDARY DISPLAY SYSTEM

(71) Applicant: Avatron LLC, Lake Oswego, OR (US)

(72) Inventor: David Howell, Lake Oswego, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 16/221,516

(22) Filed: Dec. 16, 2018

Related U.S. Application Data

(63) Continuation of application No. 15/902,779, filed on Feb. 22, 2018, now Pat. No. 10,163,422.

(60) Provisional application No. 62/461,990, filed on Feb. 22, 2017.

(51) Int. Cl.
*G06F 13/14* (2006.01)
*G09G 5/00* (2006.01)
*G06F 3/14* (2006.01)

(52) U.S. Cl.
CPC ........... *G09G 5/006* (2013.01); *G06F 3/1431* (2013.01); *G09G 2360/04* (2013.01); *G09G 2360/10* (2013.01); *G09G 2360/18* (2013.01); *G09G 2370/06* (2013.01); *G09G 2370/12* (2013.01); *G09G 2370/16* (2013.01)

(58) Field of Classification Search
CPC ...... G06F 3/14; G06F 9/452; G06F 17/30247; G06F 3/1454; G09G 5/006; G09G 2360/04; G09G 5/12
See application file for complete search history.

(56) References Cited

U.S. PATENT DOCUMENTS

| | | | |
|---|---|---|---|
| 2010/0321395 A1* | 12/2010 | Maciesowicz | G06F 3/14 345/502 |
| 2012/0176396 A1* | 7/2012 | Harper | G06F 3/1431 345/589 |
| 2014/0068007 A1* | 3/2014 | O'Gorman | H04N 7/147 709/219 |
| 2014/0146061 A1* | 5/2014 | Sultenfuss | G06F 1/3218 345/520 |
| 2016/0048980 A1* | 2/2016 | Wang | G06T 11/40 345/583 |

* cited by examiner

*Primary Examiner* — Hau H Nguyen
(74) *Attorney, Agent, or Firm* — Rylander & Associates, PC; Philip R. M. Hunt

(57) ABSTRACT

An accelerated secondary display system comprising a display adapter with a display simulator, a host computer with host software, a client device with a screen and client software. The display simulator is configured to send display characteristics to the host computer. The host computer is configured to receive the display characteristics and render an image into a frame buffer. The host software is configured to cause the host computer to stream image data over a communication channel, the image data based on the image in the frame buffer. The client software is configured to receive the image data over the communication channel and present a copy of the image on the screen based on the image data.

20 Claims, 3 Drawing Sheets

ACCELERATED SECONDARY DISPLAY SYSTEM

CROSS-REFERENCE TO RELATED APPLICATIONS

This application is a continuation of U.S. application Ser. No. 15/902,779, filed 2018 Feb. 22, which claims the benefit of U.S. Provisional Application No. 62/461,990, filed 2017 Feb. 22, all incorporated herein by reference.

TECHNICAL FIELD

This specification relates to computer hardware and software. More particularly, the present specification relates to video displays and mobile devices.

BACKGROUND

Many computer users work on the go, and are frustrated by the small screen of a laptop computer. Many of these users also carry with them a mobile device, in addition to a laptop computer. There is a need for a solution that allows computer users to use a device with a screen, such as a tablet, mobile phone, or another computer, as a monitor for a computer.

Numerous solutions are commercially available today that allow a client device with a screen to be used as a display for a host computer. With one exception, these systems convince the host computer that a physical display is connected by implementing a virtual video driver. The one exception is Air Squirrels' clever Reflector software, which implements a receiver for Apple's AirPlay protocol. But Reflector, which uses a hacked copy of Apple's private key, is a fragile solution that cannot be sold in Apple's ecosystem, can be broken by a change in Apple's AirPlay implementation at any time, and because it uses a pirated private key, is ethically questionable.

The other solutions all employ virtual video drivers. These virtual video drivers are full software drivers that convince the host computer that a physical display is connected. The host computer then renders the contents of that display into a frame buffer in memory. In turn, host software repeatedly streams the contents of that frame buffer to some external device. This is a suboptimal solution for several reasons.

In general, virtual video drivers are not associated with any physical graphic-acceleration hardware. Consequently, they are subject to severe performance and compatibility limitations, because most modern performance-dependent software is optimized to perform graphics operations with a graphics accelerator. In the absence of hardware graphics acceleration, many apps fail to render some user interface elements, render incorrectly, or crash completely. And virtual video drivers are fragile on macOS because Apple has not made its video driver protocols public and changes those protocols frequently.

One commercially available virtual video driver solution supports hardware graphics acceleration. That one, Avatron's Air Display Host for Windows (U.S. Pat. No. US9058759 B2), is fragile and very complicated, because it attempts to implement the entire application-level rendering stack. Furthermore, because Microsoft routinely adds features and complexity to its graphic acceleration driver specification, that hardware-accelerated Air Display Host needs to be updated frequently to stay compatible with Windows - and that approach only works on Windows.

At the same time, modern computer operating systems, such as macOS and Windows, do allow hardware graphics acceleration for monitors that are connected to their video output ports, such as HDMI (High-Definition Multimedia Interface), VGA (Video Graphics Array), Mini DisplayPort, and Mini DVI (Digital Visual Interface). Displays connected to these ports are driven by the computer's own video drivers, which in modern personal computers do feature graphics acceleration hardware. These operating systems do not, however, allow such automatic graphic acceleration for displays connected via Wi-Fi (Wireless Fidelity), USB (Universal Serial Bus), or custom cables. So, displays plugged into the standard video ports are fast and compatible, while those that are connected via other methods are not.

There is a recent development called a display simulator. Sometimes it is called by the misnomer "headless accelerator," but it is not an accelerator. It is a dongle, i.e., a small device that plugs into a video port (such as HDMI, DisplayPort, or VGA) and convinces the computer that it is a real display. In its simplest form, it is just a resistor plugged into two pins of a VGA port, but it can also be a small board with memory and controller chips, reporting display descriptors via DisplayID or EDID blocks. The display simulator does not display anything on a monitor, but it does convince a computer that something is plugged into a video port. In response, the computer dutifully uses its graphics accelerator to render into the frame buffer that it has associated with the phantom display. Display simulators are designed for "headless" servers, which have no physical display. They convince a server computer that a monitor is connected so that the server can use its GPU for accelerated rendering. But it doesn't provide a secondary monitor.

SUMMARY

Described herein is a system that includes a display simulator, thereby enabling a host computer to employ its own hardware graphics accelerator(s) for a secondary monitor on a separate computing client device while software running on the host computer communicates, via a data port or Wi-Fi, with software running on the client device. This allows fast performance and good compatibility, without requiring a fragile virtual video driver, to use the secondary device's screen as a secondary monitor for the host computer.

The system connects a display simulator into a host computer's standard video port, thereby getting the host computer to use its own video driver to render a changing image with hardware acceleration into a frame buffer in memory, while streaming that frame buffer's contents to an external device. One embodiment of this system comprises host software running on a host computer, client software running on a secondary client device, and a hardware adapter that includes a display simulator. In this embodiment, the host software on the host computer sends the contents of the frame buffer over a communication channel, such as USB, Wi-Fi, or Ethernet, to the client software on the client device, which in turn displays the screen contents on the client device's display.

Because this system does not require a virtual video driver, it is more robust than prior art, as it needs to conform only to well-documented publicly available hardware protocols. It is faster than a software-only virtual video display, because it derives the benefit of the host computer's hardware-accelerated video driver. It is more compatible with other software on the host computer that behaves best when an accelerated video driver is available. It is easier to maintain because it does not have the complexity of a virtual video driver.

BRIEF DESCRIPTION OF THE DRAWINGS

The accompanying drawings, which are incorporated into and constitute a part of this specification, illustrate one or more embodiments of the inventive subject matter and, together with the detailed description, serve to explain the principles and implementations thereof. Like reference numbers and characters are used to designate identical, corresponding, or similar components in different figures. The figures associated with this disclosure typically are not drawn with dimensional accuracy to scale, i.e., such drawings have been drafted with a focus on clarity of viewing and understanding rather than dimensional accuracy.

DETAILED DESCRIPTION

In describing the one or more representative embodiments of the inventive subject matter, use of directional terms such as "upper," "lower," "above," "below", "in front of" "behind," etc., unless otherwise stated, are intended to describe the positions and/or orientations of various components relative to one another as shown in the various Figures and are not intended to impose limitations on any position and/or orientation of any component relative to any reference point external to the Figures.

In the interest of clarity, not all of the routine features of representative embodiments of the inventive subject matter described herein are shown and described. It will, of course, be appreciated that in the development of any such actual implementation, numerous implementation-specific decisions must be made in order to achieve specific goals, such as compliance with application and business-related constraints, and that these specific goals will vary from one implementation to another and from one developer to another. Those skilled in the art will recognize that numerous modifications and changes may be made to the representative embodiment(s) without departing from the scope of the claims. It will, of course, be understood that modifications of the representative embodiments will be apparent to those skilled in the art, some being apparent only after study, others being matters of routine mechanical, chemical and electronic design. No single feature, function or property of the representative embodiments is essential. In addition to the embodiments described, other embodiments of the inventive subject matter are possible, their specific designs depending upon the particular application. Any embodiment described as "comprising" includes the case of "consisting only of." The scope of the inventive subject matter should not be limited by the particular embodiments herein described but should be defined only by the appended claims and equivalents thereof.

COMMON FEATURES OF THE EMBODIMENTS

Figure 1:
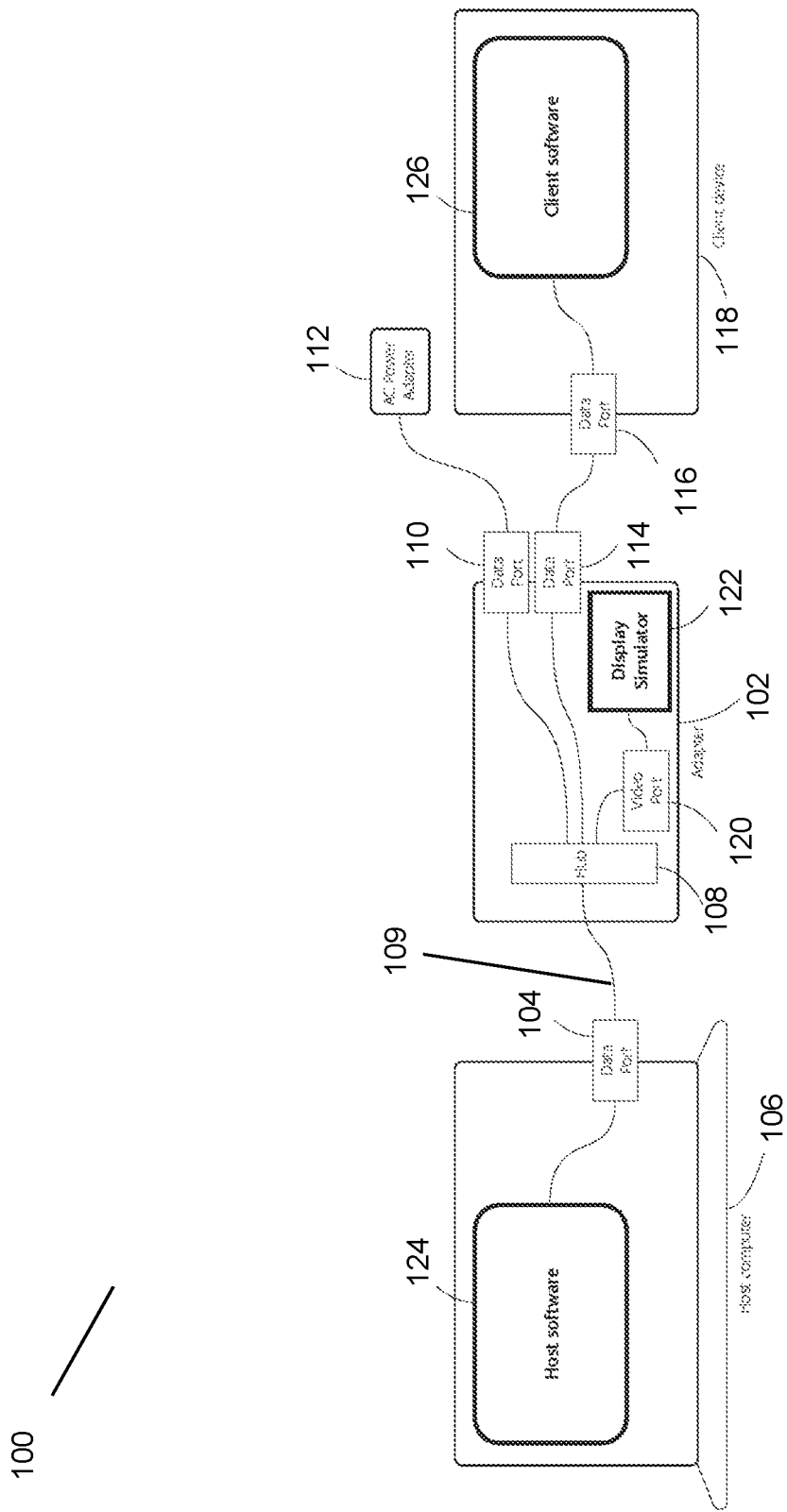
FIG. 1 is a view of a first embodiment of an accelerated secondary display system.
Figure 2:
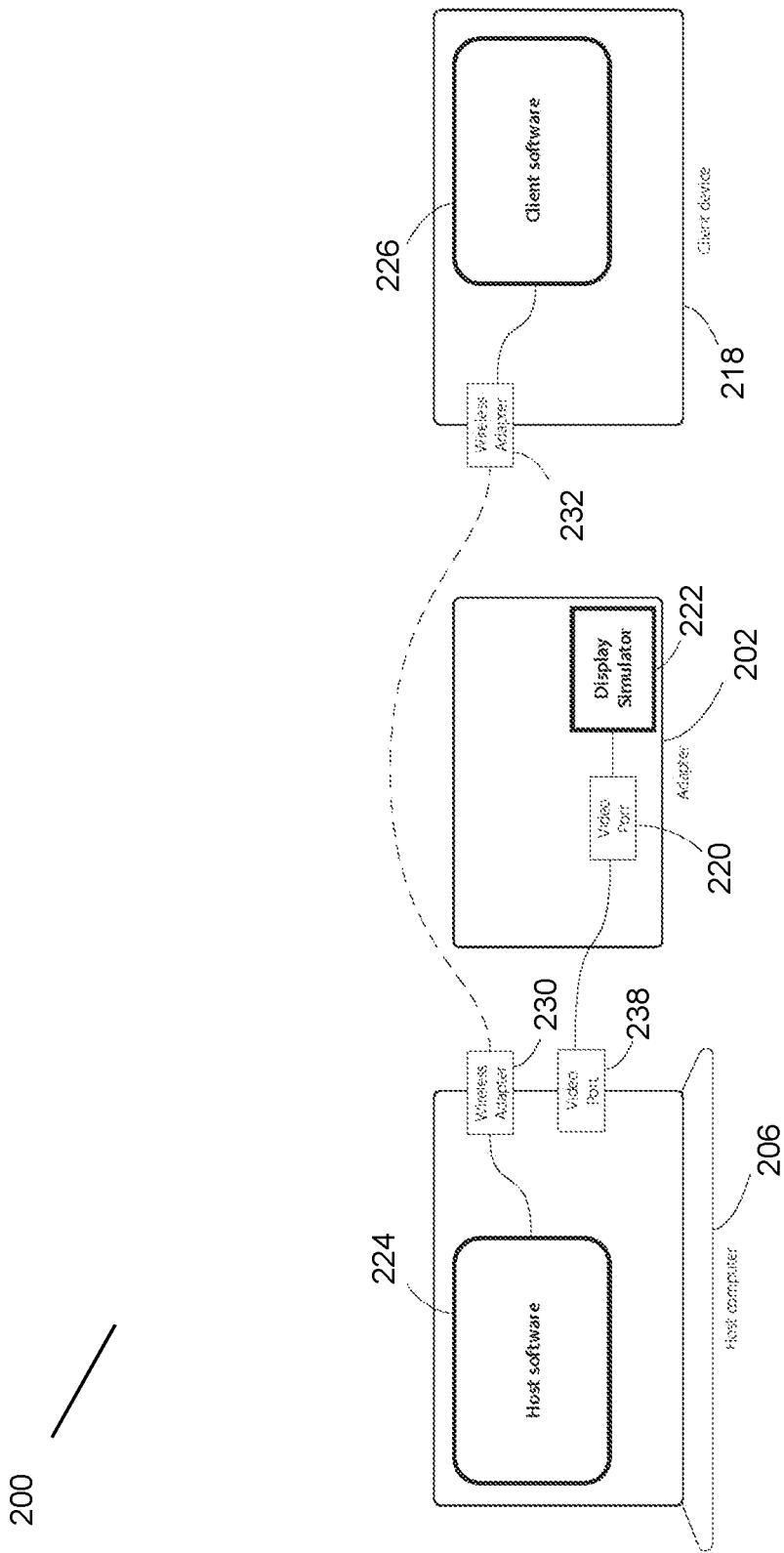
FIG. 2 is a view of a second embodiment of an accelerated secondary display system.
Figure 3:
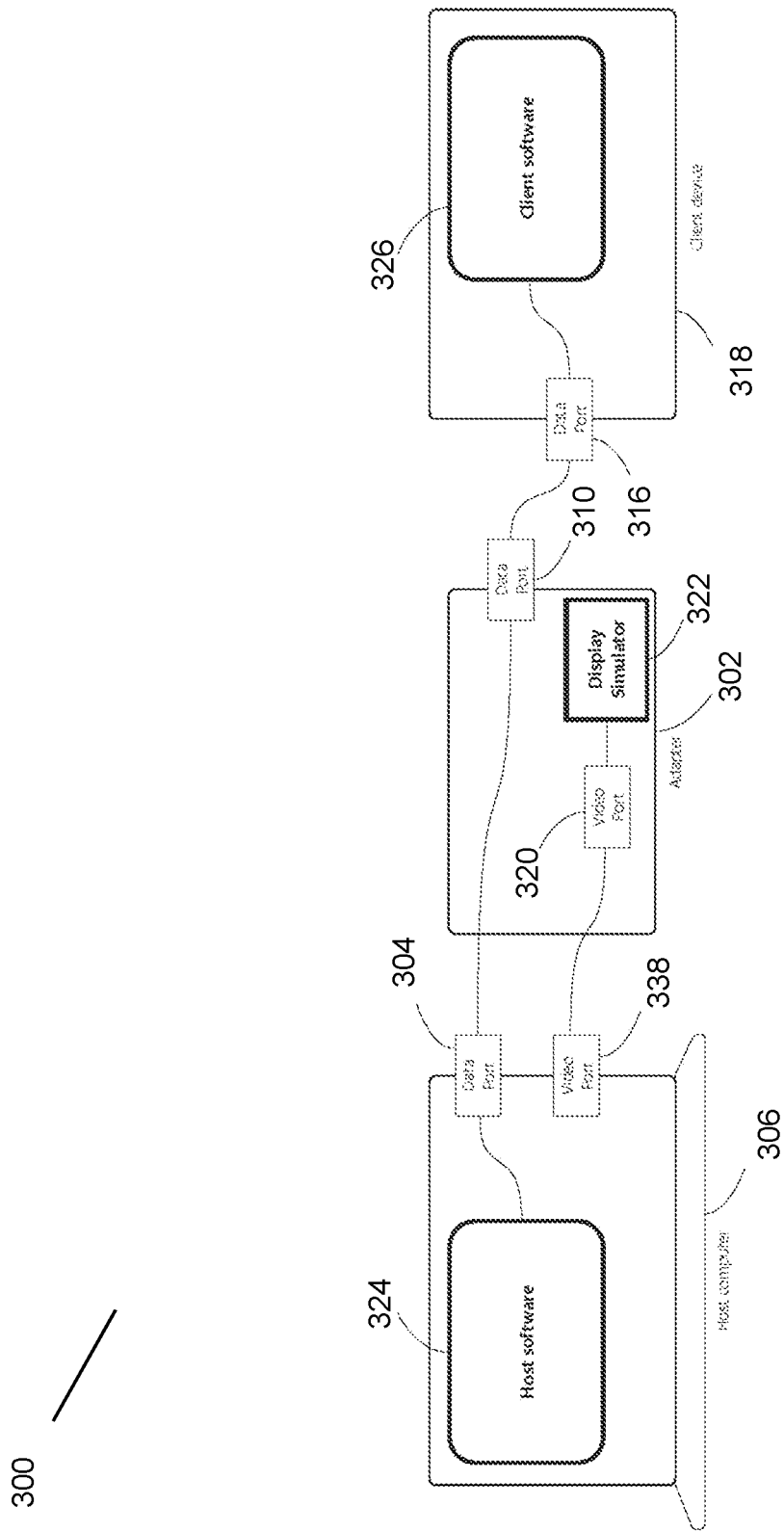
FIG. 3 is a view of a third embodiment of an accelerated secondary display system.

FIGS. 1, 2, and 3 show first, second, and third embodiments of accelerated secondary display systems (100, 200, 300). The basic components of an accelerated secondary display system are a display adapter (102, 202, 302) with a display simulator (122, 222, 322), host software (124, 224, 324), and client software (126, 226, 326). The host software (124, 224, 324) is configured to be loaded into and executed by a host computer (106, 206, 306). The client software (126, 226, 326) is configured to be loaded into and executed by a client device (118, 218, 318). The various embodiments incorporate different auxiliary components to enable communication between the host software (124, 224, 324) and client software (126, 226, 326), or to connect the display simulator (122, 222, 322) to the host computer (106, 206, 306).

The display simulator (122, 222, 322) is configured to connect to the host computer (106, 206, 306). It might be plugged directly into a video port (e.g. 238, 338), hard-wired to an internal hub (e.g. 108) in the adapter (e.g. 102), or connected via some other mechanism. Once the display simulator (122, 222, 322) is connected, it reports display characteristics to the host computer (106, 206, 306) via a standard protocol, such as DisplayID or EDID (Extended Display Identification Data), supported by the host computer (106, 206, 306). These protocols specify display capabilities and characteristics of a generic client device. Then the host software (e.g. 124, 224, 324) can override those generic capabilities and characteristics, if necessary, to correctly reflect the capabilities and characteristics of the actual connected client device (118, 218, 318). The capabilities and characteristics, as defined by the DisplayID and EDID protocols, include one or more such descriptors as manufacturer ID, date of manufacture, product code, color space, and supported resolutions and timings.

When connected to the display simulator (122, 222, 322), the host computer (106, 206, 306) uses its own display hardware adapter and driver(s) to instantiate a frame buffer in memory. The host computer (106, 206, 306) renders an image with hardware acceleration into the frame buffer. The image typically changes over time. The frame buffer maintains pixels of the image to be presented on a screen. But since the display simulator (122, 222, 322) is not a real display, no pixels are actually visible unless the host software (124, 224, 324) running on the host computer (106, 206, 306) streams image data based on the contents of the frame buffer to some other device with a screen, such as the client device (118, 218, 318).

The host software (124, 224, 324), running on the host computer (106, 206, 306), streams image data based on the frame buffer's pixels over a communication channel, such as Wi-Fi, USB, Bluetooth, or Ethernet, to the client software (126, 226, 326), which is running on a client device (118, 218, 318). In some embodiments, the host software (124, 224, 324) does this simply by repeatedly copying the entire frame buffer and sending copies of the raw pixel data as image data to the client software. In other embodiments, the host software (124, 224, 324) is more efficient, conserving bandwidth and/or processor power, and/or to yield a better frame rate. In some embodiments, the host software (124, 224, 324) subscribes to notifications from the host operating system that notify of changed regions in the frame buffer. The host software (124, 224, 324) only sends as image data copies of those pixels that have actually changed, when they have changed. In some embodiments, the host software (124, 224, 324) aggregates overlapping change regions to avoid sending duplicate copies of the same pixels. In some embodiments, the host software (124, 224, 324) employs a compression algorithm such as JPEG, PNG, MPEG, H.264, or a custom image-compression algorithm, to reduce data size of the image data. In some embodiments, the host software (124, 224, 324) converts pixels into a more efficient color space, such as YUV or 4:2:2 YCbCr, rather than RGB, to speed up compression. In some embodiments, the host software (124, 224, 324) parallelizes the pixel copying, compression, and sending as image data, both on the CPU and on the GPU. In some embodiments, the host software (124, 224, 324) optimizes parallel processing by dividing the frame buffer's pixels into tiles or bands.

The host software (124, 224, 324) sends the image data to the client software (126, 226, 326), along with metadata to assist the client software (126, 226, 326) to display the image data. In some embodiments, the metadata includes a protocol version number, the frame buffer's resolution, and a specification of a video compression codec used. The client software (126, 226, 326) receives the metadata and image data from the host software (124, 224, 324), decompresses and/or converts color spaces if necessary, and based on the image data, displays copy of the image on the screen of the client device (118, 228, 328). The image displayed on the screen of the client device (118, 228, 328) is an exact or near copy of the image comprising the pixels in the frame buffer of the host computer (106, 206, 306).

In some embodiments, the client software (126, 226, 326) also streams data back to the host software (124, 224, 324). Such data includes one or more of: The client device's native screen resolution; current orientation (landscape or portrait); and supported protocol versions.

In some embodiments, the client software (126, 226, 326) senses touch events on the screen of the client device (118, 218, 318) and streams data to describe those events back to the host software (124, 224, 324). The client software (126, 226, 326) may recognize special gestures for specific mouse actions. Examples may include two-finger tap for a secondary mouse click, or two-finger drag for a scroll-wheel event. If the client device (118, 218, 318) supports pressure sensitivity, the client software (126, 226, 326) can send pressure data to the host software (124, 224, 324), which in turn can synthesize pressure events to which the host computer (106, 206, 306) will respond as it would to a connected pressure-sensitive stylus.

The host software (124, 224, 324) may stream audio as well as video. If running on a client device with a camera, some embodiments of the client software (126, 226, 326) cause the client device (118, 218, 318) to act as a virtual web camera for the host computer (106, 206, 306). If the client device has a microphone, some embodiments the client software (126, 226, 326) cause the client device (118, 218, 318) to act as a virtual microphone for the host computer (106, 206, 306). In some embodiments, the client software (126, 226, 326) causes the client device (118, 218, 318) to act as a virtual keyboard, detecting and sending keystrokes for the host software (124, 224, 324).

FIRST REPRESENTATIVE EMBODIMENT

As shown in FIG. 1, the first embodiment accelerated secondary display system 100 comprises a first embodiment display adapter 102, first embodiment host software 124, and first embodiment client software 126. The host software 124 is configured to load into and run on a host computer 106 that has a data port 104 that is USB-C compliant. The client software 126 is configured to load into and run on a client device 118 with a client data port 116.

The display adapter 102 has a hub 108 that splits an adapter data connection cable 109 into three output ports: a first adapter data port 110 that is USB-A compliant, a second adapter data port 114 that is USB-C compliant, and a video port 120 that is HDMI (High-Definition Multimedia Interface) compliant. The hub port is configured to connect to the host data port 104 via a cable. The first adapter data port 110 is configured to connect via a cable to the client data port 116 on the client device 118. The second adapter data port 114 is configured to connect to an AC power adapter 112. The adapter video port 120 is connected to a display simulator 122. In the first embodiment accelerated secondary display system 100, the host software 124 communicates with the client software 126 via a communication channel that is USB-3 compliant. The client data port 116 may be, for example, a Lightning port or 30-pin dock connector port on an iOS device or a microUSB port on an Android device. In some alternative embodiments, the communication between the host software 124 and the client software 126 is handled by a wireless communication channel, similar to the second embodiment accelerated secondary display system 200.

The hub 108 inside the display adapter 102 is functionally equivalent to a "USB Type C to HDMI +USB Type A +Type C Power Charging Port Multi Hub Combo Adapter," which is commercially available from many vendors. Since the HDMI port is not exposed externally, some components of the hub 108 can be eliminated, notably the bridge chip. The power-charging port is not in all embodiments, because most host computers have a separate power-charging port.

SECOND REPRESENTATIVE EMBODIMENT

The second embodiment, shown in FIG. 2, is simpler than the first embodiment and is compatible with a host computer with an HDMI video port. The second embodiment accelerated secondary display system 200 comprises a second embodiment display adapter 202, second embodiment host software 224, and second embodiment client software 226. The host software 224 is configured to load into and run on a host computer 206 that has a video port 238 (which may be HDMI, mini DisplayPort, or some other type of video port) and a host wireless adapter 230. The client software 226 is configured to load into and run on a client device 218 with a client wireless adapter 232.

In the second embodiment accelerated secondary display system 200, data is communicated between host software 224 and client software 226 via the host wireless adapter 230 and the client wireless adapter 232. No extra hardware is needed in the second embodiment display adapter 202 for the data channel between the host computer 206 and client device 218. The second embodiment display adapter 202 has a display simulator 222 connected to a video port 220 (HDMI). The adapter video port 220 is configured to connect via a cable to the HDMI video port 238 on of the host computer 206.

THIRD REPRESENTATIVE EMBODIMENT

Another embodiment, shown in FIG. 3, is compatible with a host computer that has a USB-A port and an HDMI port. The third embodiment accelerated secondary display system 300 comprises a third embodiment display adapter 302, third embodiment host software 324, and third embodiment client software 326. The host software 324 is configured to load into and run on a host computer 306 that has a video port 338 that is HDMI compliant and a data port 304 that is USB-A compliant. The client software 326 is configured to load into and run on a client device 318 with a client data port 316.

In this embodiment, the display adapter 302 is connected to a video port 320 (HDMI compliant) in the display adapter 302, which in turn is connected to the video port 338 of the host computer 306. The communication channel between the host software 324 and the client software 326 is a very simple wired connection—a cable connected to the host computer's USB-A data port 304 passes through the display adapter 302 into a USB-A data port 314 on the adapter, which in turn is configured to connect via a cable to a data port 316 on the client device 318.

What is claimed is:

1. An accelerated secondary display system comprising:
 a display adapter with a display simulator configured to transmit display characteristics;
 a host computer with a host computer memory storing host software, the host computer separate from the display adapter and configured to connect with the display adapter, the host computer configured to receive the display characteristics, instantiate a frame buffer in the host computer memory, render an image into the frame buffer, maintain pixels of the image in the frame buffer, and execute the host software, wherein the host software is configured to cause the host computer to stream image data over a communication channel, the image data based on the pixels of the image in the frame buffer, wherein the host software is configured to work with a host computer operating system that is not specially modified to work with the display adapter and host software;
 wherein the display simulator is configured to convince the host computer that a display is connected to the host computer by transmitting the display characteristics to the host computer; and
 a client device with a screen and a client device memory storing client software, the client device separate from the display adapter and the host computer, wherein the client software is configured to, when executed, receive the image data over the communication channel and present a copy of the image on the screen based on the image data.

2. An accelerated secondary display system comprising:
 a display adapter with a display simulator configured to transmit display characteristics;
 a host computer with a host computer memory storing host software, the host computer separate from the display adapter and configured to connect with the display adapter, the host computer configured to receive the display characteristics, instantiate a frame buffer in the host computer memory, render an image into the frame buffer, maintain pixels of the image in the frame buffer, and execute the host software, wherein the host software is configured to cause the host computer to stream image data over a communication channel, the image data based on the pixels of the image in the frame buffer, wherein the host software is configured to work with a host computer operating system that is not specially modified to work with the display adapter and host software;
 wherein the display simulator is configured to convince the host computer that a display is connected to the host computer;
 a client device with a screen and a client device memory storing client software, the client device separate from the display adapter and the host computer, wherein the client software is configured to, when executed, receive the image data over the communication channel and present a copy of the image on the screen based om the image data;
 wherein the display adapter further comprises an adapter data connection cable, a hub that splits the adapter data connection cable into an adapter data port and an adapter video port;
 wherein the display simulator is coupled to the adapter video port;
 wherein the host computer has a host data port coupled to the adapter data connection cable;
 wherein the client device has a client data port coupled to the adapter data port; and
 wherein the communication channel is carried by the adapter data connection cable, the adapter data port and the client data port.

3. The accelerated secondary display system of claim 2, wherein the adapter data port is USB-A compliant; and
 wherein the adapter video port is compliant with one of HDMI (High-Definition Multimedia Interface) and mini DisplayPort.

4. The accelerated secondary display system of claim wherein the host computer has a host wireless adapter;
 wherein the client device has a client wireless adapter; and
 wherein the communication channel is carried by the host wireless adapter and the client wireless adapter.

5. The accelerated secondary display system of claim 2, wherein the host computer has a host video port coupled to the display simulator;
 wherein the host computer has a host data port;
 wherein the client device has a client data port coupled to the host data port; and
 wherein the communication channel is carried by the host data port and the client data port.

6. The accelerated secondary display system of claim 2, wherein the host computer has a host video port coupled to the display simulator;
 wherein the host computer has a host data port;
 wherein the display adapter further comprises an adapter data port;
 wherein the client device has a client data port coupled to the host data port through the adapter data port; and
 wherein the communication channel is carried by the host data port and the client data port.

7. The accelerated secondary display system of claim 2, wherein the display characteristics transmitted by the display simulator are generic display characteristics;
 wherein the client software is configured to transmit display characteristics that are client device display characteristics; and
 wherein the host software is further configured to cause the host computer to use the client device display characteristics in rendering the image and streaming image data.

8. The accelerated secondary display system of claim 2, wherein the host software is further configured to compress the image data, and the client software is configured to decompress the image data.

9. The accelerated secondary display system of claim 8, wherein the host computer has a central processing unit (CPU) and a graphics processing unit (GPU); and
 wherein the host software is further configured to use parallel processing, splitting processing between the CPU and GPU when pixel copying from the image, compressing and streaming image data.

10. The accelerated secondary display system of claim 9, wherein the host software is further configured to use parallel processing by causing the host computer to divide the frame buffer pixels into tiles.

11. The accelerated secondary display system of claim 2, wherein the communication channel is wireless.

12. The accelerated secondary display system of claim 2, wherein the communication channel is wired.

13. An accelerated secondary display system comprising:
a display adapter with a display simulator configured to transmit display characteristics;
a host software configured to be executed by a host computer, the host computer separate from the display adapter, the host computer configured to connect with the display adapter via a cable, receive the display characteristics, instantiate a frame buffer in a host computer memory, wherein the host software, when executed, is configured to cause the host computer to stream image data over a communication channel, the image data based on pixels of an image in a frame buffer in the host computer, wherein the host software is configured to work with a host computer operating system that is not specially modified to work with the display adapter and host software;
a client software, configured to be executed by a client device with a screen, the client device separate from the display adapter and the host computer, wherein the client software, when executed, is configured to receive the image data over the communication channel and present a copy of the image on the screen based on the image data;
wherein the display characteristics transmitted by the display simulator are generic display characteristics;
wherein the client software is further configured to transmit display characteristics that are client device display characteristics; and
wherein the host software is further configured to cause the host computer to use the client device display characteristics in rendering the image and streaming image data.

14. The accelerated secondary display system of claim 13, wherein the host software is further configured to stream audio data to the client software.

15. The accelerated secondary display system of claim 13, wherein the client software is further configured to stream audio data to the host software.

16. The accelerated secondary display system of claim 13, wherein the client software is further configured to stream client image data from a camera in the client device to the host software.

17. The accelerated secondary display system of claim 13, wherein the client software is further configured to stream data to the host software that includes one or more of: client device native screen resolution, current orientation, and supported protocol versions.

18. The accelerated secondary display system of claim 13, wherein the host software is further configured to send raw pixel data as the image data.

19. The accelerated secondary display system of claim 13, wherein the host software is further configured to compress the image data, and the client software is configured to decompress the image data.

20. An accelerated secondary display system comprising:
a display adapter with a display simulator configured to transmit display characteristics;
a host computer with a host computer memory storing host software, the host computer separate from the display adapter and configured to connect with the display adapter, the host computer configured to receive the display characteristics, instantiate a frame buffer in the host computer memory, render an image into the frame buffer, maintain pixels of the image in the frame buffer, and execute the host software, wherein the host software is configured to cause the host computer to stream image data over a communication channel, the image data based on the pixels of the image in the frame buffer, wherein the host software is configured to work with a host computer operating system that is not specially modified to work with the display adapter and host software;
a client device with a screen and a client device memory storing client software, the client device separate from the display adapter and the host computer, wherein the client software is configured to, when executed, receive the image data over the communication channel and present a copy of the image on the screen based on the image data;
wherein the display characteristics transmitted by the display simulator are generic display characteristics;
wherein the client software is configured to transmit display characteristics that are client device display characteristics; and
wherein the host software is further configured to cause the host computer to use the client device display characteristics in rendering the image and streaming image data.

* * * * *